UNITED STATES PATENT OFFICE.

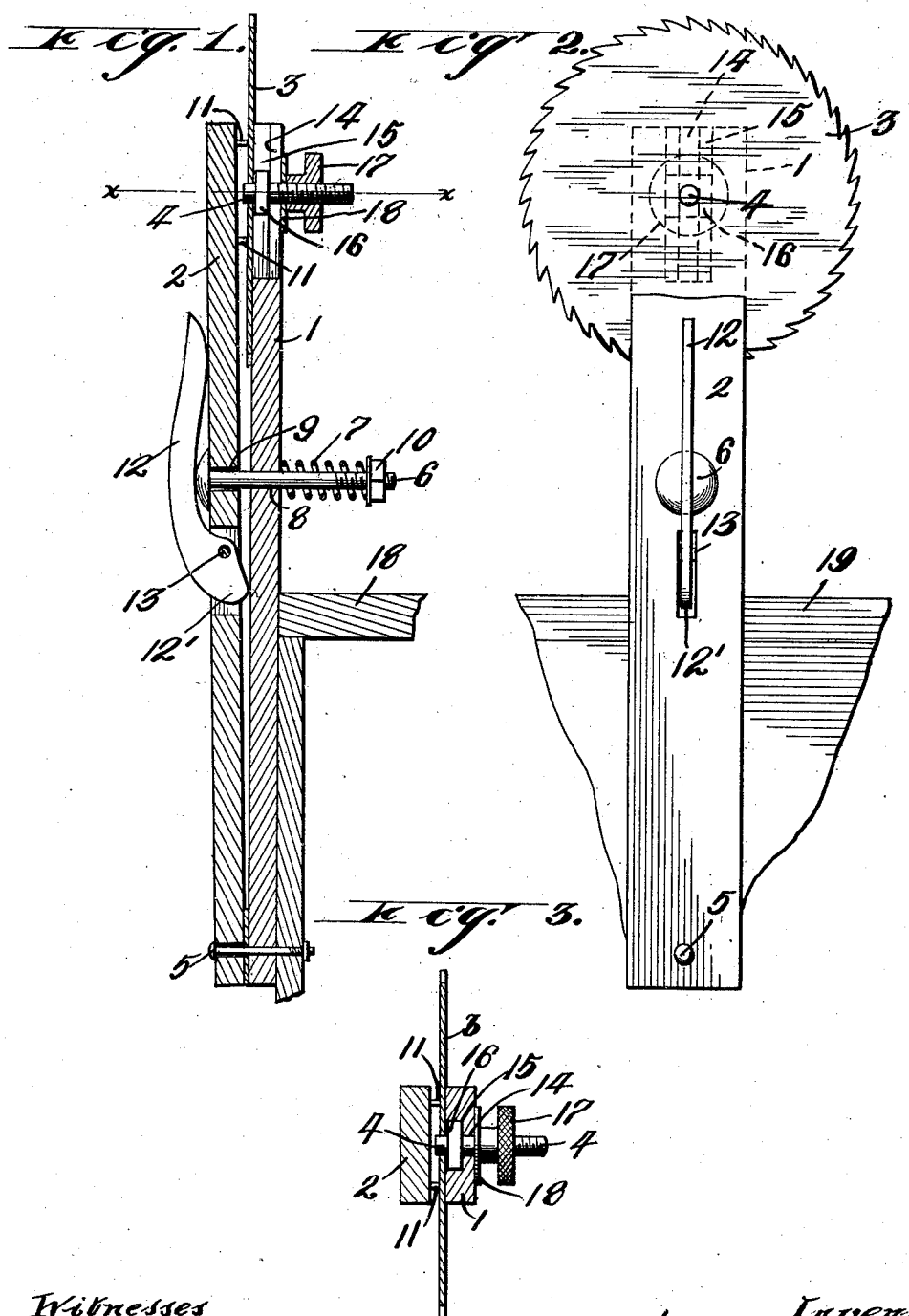

JOSEPH RUSSELL, OF BUSWELL, WISCONSIN.

CLAMP FOR BUZZ-SAWS.

985,209.  Specification of Letters Patent.  Patented Feb. 28, 1911.

Application filed July 23, 1910. Serial No. 573,400.

*To all whom it may concern:*

Be it known that I, JOSEPH RUSSELL, a citizen of the United States, residing at Buswell, county of Vilas, and State of Wisconsin, have invented new and useful Improvements in Clamps for Buzz-Saws, of which the following is a specification.

My invention relates to improvements in devices for clamping and holding buzz saws while being sharpened or set.

The object of my invention is to provide a simple and convenient clamp for holding a buzz saw by which the saw is not only rigidly held in a convenient position to be sharpened and set, but also by which the saw is quickly and easily released, revolved on its central support, and readjusted from time to time, as the teeth are being put in order, and also by which the central support is readily adjusted higher or lower as may be required for holding saws of greater or less diameter.

My invention is further explained by reference to the accompanying drawings, in which—

Figure 1 represents a vertical section, and Fig. 2 a front view thereof in connection with the side of the supporting bench, and Fig. 3 is a horizontal section, drawn on line $x$—$x$ of Fig. 1.

Like parts are identified by the same reference numerals throughout the several views.

The clamp comprises the vertical member 1 and the inclinable member 2 between which the buzz saw 3 is revolubly supported on the trunnion 4. The members 1 and 2 are pivotally connected together at their lower ends by the bolt 5 and said members are drawn toward each other in position to hold the saw by the bolt 6 and spiral spring 7. The bolt 6 is slidably supported from the members 1 and 2 in apertures 8 and 9. The spring 7 is interposed between the vertical member 1 and the nut 10, and the tension on said spring is increased or diminished by turning the nut 10 forwardly or backwardly on the bolt, whereby the desired tension is produced on said spring for rigidly holding the saw 3 in place as it is being sharpened or set. The clamping member 2 is preferably provided with a plurality of contact bearings 11, which are adapted to bear against the saw and coöperate with the opposing clamping member in holding the saw in place. 12 is an eccentric lever which is pivotally supported from the clamping member 2 on the pivotal bolt 13 and the said lever is so shaped that when brought to the vertical position shown in Figs. 1 and 2, said clamping members are free to be drawn toward each other and against the saw by the recoil of said spiral spring 7. When, however, it is desirous to readjust the saw, the upper arm of said lever is moved downwardly, whereby its opposite end 12' is brought in contact with the opposing clamping member 1, whereby the upper ends of said clamping members are separated, said saw is released, and free to be readjusted. Thus it is obvious that said saw is readily released, preparatory to be readjusted from time to time, as the teeth are being sharpened or set by simply bearing down upon the long arm of the lever 12, while said clamping members 1 and 2 are brought toward each other and said saw is clamped by the reverse movement of said lever.

It will be understood that when sharpening or setting saws of greater or less diameter, it becomes necessary to adjust the saw supporting trunnion to correspond with the diameter of such saw. In view of this fact, I have provided the trunnion supporting member 1 with the vertical slot 14, for the reception of said trunnion and a vertical recess 15, for the reception of the collar 16, and said trunnion 4 is provided upon one side of said member 1 with the hand nut 17 and a washer 18, whereby when said hand nut is turned back on said trunnion it is free to be raised or lowered when it is retained at any desired point of adjustment by turning forward said hand nut on said trunnion. It will also be understood that when said hand nut 17 is turned forward on said trunnion, that portion of the member 2 upon the respective sides of the slot 14 is securely clamped by and between the collar 16 and a washer 18, whereby said trunnion is rigidly retained at any desired point of adjustment in said slot.

19 is a bench to the side of which the clamping members 1 and 2 are secured and by which they are retained in their proper vertical position for use.

Having thus described my invention, what I claim as new, and desire to secure by Letters Patent, is—

1. In a device of the described class, the combination of two clamping members pivotally connected together at their lower ends and provided near their upper ends with an aperture for the reception of a clamping bolt, a clamping bolt supported in said apertures, a spiral spring interposed between one of said clamping members and a bearing on one end of said bolt and adapted by its recoil to draw said clamping members together, a trunnion adapted to revolubly support a saw from one of said clamping members, an eccentric lever pivotally connected with the opposing clamping member and adapted as it is moved in one direction, to separate said clamping members, and when moved in the opposite direction, to permit said members to be drawn together by the recoil of said spring.

2. In a device of the described class the combination of two clamping members pivotally connected together at their lower ends and provided near their upper ends with an aperture for the reception of a clamping bolt, a clamping bolt supported in said apertures, a spiral spring interposed between one of said clamping members and a bearing on one end of said bolt and adapted by its recoil to draw said clamping members together, means for increasing and diminishing the tension of said spring, a trunnion adapted to revolubly support a saw from one of said clamping members, an eccentric lever pivotally connected with the opposite clamping member and adapted as it is moved in one direction, to separate said clamping members, and when moved in the opposite direction, to permit said members to be drawn together by the recoil of said spring.

3. In a device of the described class, the combination of two clamping members pivotally connected together at their lower ends and provided near their upper ends with an aperture for the reception of a clamping bolt, a clamping bolt supported in said apertures, a spiral spring interposed between one of said clamping members and a bearing on one end of said bolt and adapted by its recoil to draw said clamping members together, means for increasing and diminishing the tension of said spring, a trunnion adjustably supported from one of said clamping members adapted to revolubly support a saw, an eccentric lever pivotally connected with the opposite clamping member and adapted as it is moved in one direction, to separate said clamping members, and when moved in the opposite direction, to permit said members to be drawn together by the recoil of said spring.

In testimony whereof I affix my signature in the presence of two witnesses.

JOSEPH RUSSELL.

Witnesses:
J. G. LOCKHART,
ROBT. M. KUMLIN.

---

Copies of this patent may be obtained for five cents each, by addressing the "Commissioner of Patents, Washington, D. C."